United States Patent
Watanabe

(10) Patent No.: US 7,142,561 B1
(45) Date of Patent: Nov. 28, 2006

(54) PATH SETTING CONTROL METHOD AND SWITCHING SYSTEM

(75) Inventor: Yoshihiro Watanabe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/382,458

(22) Filed: Aug. 25, 1999

(30) Foreign Application Priority Data

Dec. 18, 1998 (JP) .................................. 10-361590

(51) Int. Cl.
- H04J 3/16 (2006.01)
- H04L 12/28 (2006.01)
- H04L 12/56 (2006.01)

(52) U.S. Cl. ............... 370/468; 370/230.1; 370/395.41

(58) Field of Classification Search ................ 375/351, 375/352, 357, 360, 363, 395.1, 397, 395.3, 375/395.31, 395.42, 395.43, 468, 395.61, 375/402, 230.1, 230, 412

See application file for complete search history.

(56) References Cited

U.S. PATENT DOCUMENTS

| | | | | |
|---|---|---|---|---|
| 5,867,663 | A * | 2/1999 | McClure et al. ............. | 709/234 |
| 6,005,847 | A * | 12/1999 | Gilbert et al. ............... | 370/264 |
| 6,097,722 | A * | 8/2000 | Graham ....................... | 370/395 |
| 6,229,820 | B1 * | 5/2001 | Kanemaki et al. .......... | 370/468 |
| 6,282,197 | B1 * | 8/2001 | Takahashi ................... | 370/395 |
| 6,359,889 | B1 * | 3/2002 | Tazaki ........................ | 370/395 |

OTHER PUBLICATIONS

Yoshiaki Osaki, JP 2-145052, "Line Setting System in Multi-Medium Exchange System"; Jun. 4, 1990 (Toshiba Corporation), Patent Abstract of Japan.
Goto Isamu et a., JP 7-058874, "Communication Connection Method", Mar. 3, 1995 (NIPPON TELEGR & TELEPH CORP <NTT>), Patent Abstract of Japan.

* cited by examiner

*Primary Examiner*—Chi Pham
*Assistant Examiner*—Ronald Abelson
(74) *Attorney, Agent, or Firm*—Staas & Halsey LLP

(57) ABSTRACT

A path setting method and device to secure bandwidth for multiple paths to provide a service from a service provider to a subscriber. The path setting device determines whether a received message is a request message for a first path, the request message including requested bandwidth information for a plurality of paths set for the service required by the subscriber. The bandwidth is secured based on the requested bandwidth information set in the request message for the first path between the service provider and the subscriber in response to receiving the request message for the first path. The bandwidth may also be secured by determining whether a received message is a request message and determining whether a number of request messages received from the same subscriber reaches a number of paths set in the request message for the first path. The bandwidth required for all paths set to provide the service for the subscriber is secured when the number of request messages received from the same subscriber reaches the number of paths set in the request message for the first path.

17 Claims, 13 Drawing Sheets

FIG. 5A

| SETUP |
|---|
| CALL NUMBER |
| THE NUMBER OF PATHS n REQUIRED TO PROVIDE THE SERVICE FOR A SUBSCRIBER. |
| PCR, SCR, MBS AND CDV OF PA1. |
| PCR, SCR, MBS AND CDV OF PA2. |
| PCR, SCR, MBS AND CDV OF PA3. |
| ... |
| PCR, SCR, MBS AND CDV OF PAn. |
|  |

FIG. 5B

| ADD CONN |
|---|
| CALL NUMBER (SAME AS SETUP) |
|  |
| PCR, SCR, MBS AND CDV OF PA2 (3 TO n) |
|  |

TABLE 1

| CALL NUMBER | THE NUMBER OF PATHS | VPI/VCI | REQUESTED BANDWIDTH QUALITY OF SERVICE, TRAFFIC PARAMETERS | PRESUMED BANDWIDTH CELL/SEC | TOTAL PRESUMED BANDWIDTH (Mbps) | AVAILABLE BANDWIDTH (Mbps) |
|---|---|---|---|---|---|---|
| 3 | 3 | 0/32<br>0/33<br>0/34 | QOS = 1, PCR = 100<br>QOS = 0, PCR = 10000, SCR = 200, MBS = 100<br>QOS = 3, PCR = 10000, SCR = 100, MBS = 100 | 110<br>267<br>7000 | 3.128 | 146.872 |
| 4 | 3 | 0/35<br>0/36<br>0/37 | QOS = 1, PCR = 100<br>QOS = 0, PCR = 10000, SCR = 200, MBS = 100<br>QOS = 3, PCR = 10000, SCR = 100, MBS = 100 | 110<br>267<br>7000 | 3.128 | 143.744 |

PATH SETTING CONTROL METHOD AND SWITCHING SYSTEM

CROSS-REFERENCE TO RELATED APPLICATION

This application is based upon and claims priority of Japanese patent application No. 10-361590 filed on Dec. 18, 1998, the contents being incorporated herein by reference.

BACKGROUND OF THE INVENTION

1. Field of the Invention

The present invention relates to a path setting method and apparatus for setting multiple paths to provide a service for a subscriber. More particularly, the present invention relates to a path setting method and apparatus for securing a bandwidth for all paths required to provide a service for a subscriber.

2. Description of the Related Art

A system whereby multiple paths are set when a service is provided for a subscriber is well known. For example, a video-on-demand (VOD) service includes a well-known system whereby a control channel, a voice channel and an image channel, respectively, are set and a service is provided to a subscriber from a server via a switching system. However, there is a demand for increased efficiency for the setting of paths in this type of system.

FIG. 1 illustrates an example of a conventional switching system. As shown in FIG. 1, the switching system 30 includes a switching part 33, and circuit handling parts 32. A server 35 (service provision subscriber) regenerates and provides video images requested by subscribers 31 A, B, C. The circuit handling parts 32 include an optical-electrical exchange part to connect subscribers 31 or server 35 by an optical transmission path. When the switching system 30 shown in FIG. 1 is an asynchronous transfer mode (ATM) switching system, it includes smoothing and policing functions of the ATM cell.

The switching system 30 sets the control channel, the voice channel and the image channel between subscribers 31 and the server 35 for the service provided by the server 35. Thus, a VOD service, which sends the regenerated voices and images from the server 35, is provided by sending requests from subscribers 31 to server 35 via the control channel. In other words, the VOD service using the switching system 30 differs from a conventional video-on-demand service offered on cable television and elsewhere in that it makes multiple settings between subscribers 31 and server 35 for dedicated channels which have bandwidths which are the same or are different. For example, the control channel can have a 16 Kbps or a 64 Kbps bandwidth; the voice channel can have a 64 Kbps bandwidth; and, the image channel can be have a 3 Mbps or a 5 Mbps bandwidth.

FIG. 2 is an explanatory diagram of a prior art control sequence for setting the control channel, the voice channel and the image channel with the switching system shown in FIG. 1. As shown in FIG. 2, subscribers 31 A, B, C, D, the switching system 30 and the server 35 are indicated by vertical lines. For example, when subscriber A sends a SETUP (call setting request) message to set the control channel, the switching system secures the control channel bandwidth and sends the message to the server. Likewise, subscribers B, C and D send SETUP messages to set the control channels in the same manner. The server sends path completion response messages to subscribers A, B, C and D for the SETUP messages which set the control channels.

Next, subscribers A, B, C and D send SETUP messages to set the voice channels. The switching system secures a bandwidth for the voice channels. The server sends path completion response messages for the SETUP messages which set the voice channels to subscribers A, B, C and D.

Next, subscribers A, B, C and D send SETUP messages to set the image channels. The switching system secures the bandwidth for the image channels and sends SETUP messages to the server. The server sends path completion response messages for the SETUP messages which set the image channels to subscribers A, B, C and D.

Since the control channel, the voice channel and the image channel are set between subscribers A, B, C and D and the server by the above-described type of operations, a request is sent to the server via the control channel so that video reproduction images and the like can be provided from the server via the voice channel and the image channel.

In the prior art system wherein a service, such as the VOD service and other similar types of services, is provided by setting multiple paths for a subscriber, if the bandwidth for the control channel is 64 Kbps, the bandwidth for the voice channel is 64 Kbps, the bandwidth for the image channel is 3 Mbps and the available bandwidth between the switching system and the server is 30 Mbps, then the control channel, voice channel, image channel are set, in that order. Thus, for example, when 235 subscribers call in at the same time and the control channel and the voice channel have been set, the total bandwidth is (64 Kbps+64 Kbps)×235=30,080 Kbps=30.08 Mbps, and the bandwidth exceeds 30 Mbps of available bandwidth by only 80 Kbps.

Thus, when the required bandwidth adds up to more than the available bandwidth, there is no remaining bandwidth and an image channel setting cannot be made for the subscribers who have called in. In this case, in accordance with the prior art, a path disable message is sent to all the subscribers who have called in. As a result, even if the available bandwidth is 30 Mbps and nine (9) subscribers can receive the VOD service ((64 Kbps+64 Kbps+3 Mbps)× 9=28,152 Kbps<30 Mbps), when the subscribers call in at once and set the control channels and the voice channels, the available bandwidth between the switching system and the server disappears. Therefore, the image channel can no longer be set and, as a result, none of the subscribers can be provided the VOD service. Furthermore, there are problems in that service deteriorates.

SUMMARY OF THE INVENTION

An object of the present invention is to provide a path setting method and apparatus which efficiently secures a bandwidth for all paths required to provide a service for a subscriber.

Another object of the present invention is to provide a method and apparatus to secure a bandwidth of all paths required to provide a service for a subscriber at the same time.

Another object of the present invention is to provide a method and apparatus to secure a bandwidth of all paths required to provide a service for a subscriber when a request message for a first path is received or when all of the request messages for a subscriber are received.

A further object of the present invention is to provide a service provider (server) to secure a bandwidth for all paths required to provide a service for a subscriber when the service provider receives a request message for a first path.

Another object of the present invention is to provide a subscriber terminal to send request messages to the switching system in order of large bandwidth to small bandwidth in the various bandwidths which correspond to multiple paths of the service.

Objects and advantages of the present invention are achieved in accordance with embodiments of the present invention with a path setting device to secure bandwidth for multiple paths to provide a service from a service provider to a subscriber, comprising means for determining whether a received message is a request message for a first path, the request message including requested bandwidth information for a plurality of paths set for the service required by the subscriber; and means for securing a bandwidth based on the requested bandwidth information set in the request message for the first path between the service provider and the subscriber in response to receiving the request message for the first path.

In accordance with embodiments of the present invention, the path setting device may further comprise means for calculating a bandwidth required for all paths set to provide the service for a subscriber based on the requested bandwidth information set in the request message for the first path from the subscriber; means for comparing the calculated bandwidth to an available bandwidth between the service provider and the subscriber; means for securing the calculated bandwidth if the calculated bandwidth is less than or equal to the available bandwidth; means for setting the first path between the service provider and the subscriber in response to the request message for the first path; and means for notifying the subscriber that it is impossible to set a path if the calculated bandwidth is larger than the available bandwidth.

Moreover, in accordance with embodiments of the present invention, the path setting device may further comprise means for determining whether the received message is a following request message for a remaining path in which information identifying the request message for the first path is set; and means for setting the remaining path between the service provider and the subscriber in response to the following request message for the remaining path.

In accordance with embodiments of the present invention, the information identifying the request message may be a call number.

Objects and advantages of the present invention are achieved in accordance with embodiments of the present invention with a path setting control method of securing bandwidth for multiple paths to provide a service from a service provider to a subscriber via a switching system, comprising sending a request message for a first path from the subscriber to the switching system, the request message including requested bandwidth information for setting each of the multiple paths to provide the service for a subscriber; and securing a bandwidth based on the requested bandwidth information in the request message for the first path between the service provider and the subscriber in response to receiving the request message for the first path at the switching system.

In accordance with embodiments of the present invention, the path setting control method may further comprise setting the first path in response to the request message for the first path between the service provider and the subscriber; and setting a remaining path in response to the following request message for the remaining path between the service provider and the subscriber.

Objects and advantages of the present invention are achieved in accordance with embodiments of the present invention with a switching system for setting multiple paths for a service provided from a service provider to a subscriber, comprising an extraction device to extract messages from a subscriber; a message determination device to determine whether the message extracted by the message extraction device is a request message for a first path between the service provider and the subscriber; and a bandwidth securing and processing device to secure a bandwidth based on requested bandwidth information set in the request message in response to receiving the request message for the first path.

The switching system may further comprise a presumed bandwidth calculating device to calculate a presumed bandwidth for each respective path based on the requested bandwidth information set in the request message, and to calculate a total presumed bandwidth based on the presumed bandwidths.

In accordance with embodiments of the present invention, the bandwidth securing and processing device compares the bandwidth to the available bandwidth, and secures the bandwidth in response to determining that the bandwidth is less than or equal to the available bandwidth.

In accordance with embodiments of the present invention, the bandwidth securing and processing device compares the total presumed bandwidth to the available bandwidth, and secures the total presumed bandwidth in response to determining that the total presumed bandwidth is less than or equal to the available bandwidth.

As a result, in accordance with embodiments of the present invention, since the required bandwidth is secured from the request message for the first path, available bandwidth can be effectively allocated. Furthermore, when a bandwidth required by the subscriber cannot be secured, the subscriber can be notified immediately Objects and advantages of the present invention are achieved in accordance with embodiments of the present invention with a path setting device to secure bandwidth to provide a service from a service provider to a subscriber, comprising means for determining whether a received message is a request message; means for determining whether a number of request messages received from the same subscriber reaches a number of paths set in the request message for the first path; means for securing a bandwidth required for all paths set to provide the service for the subscriber between the service provider and the subscriber when the number of request messages received from the same subscriber reaches the number of paths set in the request message for the first path.

Objects and advantages of the present invention are achieved in accordance with embodiments of the present invention with a path setting control method of securing bandwidth for multiple paths to provide a service from a service provider to a subscriber via a switching system, comprising sending a request message for a first path from the subscriber to the switching system, in which a number of paths required to provide the service for a subscriber is set; sending as many request messages as the number of paths successively from the subscriber to the switching system; securing the bandwidth required for all paths set to provide the service for a subscriber between the service provider and the subscriber when a number of request messages reaches the number of paths set in the request message for the first path.

Objects and advantages of the present invention are achieved in accordance with embodiments of the present invention with a service provider to provide a service by using multiple paths to a subscriber via a switching system, comprising means for receiving a request message for a first path from the subscriber via the switching system; means for securing a bandwidth of all the multiple paths required to provide the service for a subscriber in response to receiving the request message for the first path; means for sending a connection message to the switching system in response to receiving the request message for the first path after securing the bandwidth; and means for sending the connection message to the switching system in response to receiving a following request message for another path from the subscriber.

Objects and advantages of the present invention are achieved in accordance with embodiments of the present invention with a path setting control method of setting multiple paths for a service provided from a service provider to a subscriber via a switching system, comprising sending a request message from the subscriber to the switching system to set in order of large bandwidth to small bandwidth the various bandwidth which correspond to multiple paths required to provide the service; and securing the bandwidth required between the service provider and the subscriber in order of large bandwidth to small bandwidth in response to the request message.

Objects and advantages of the present invention are achieved in accordance with embodiments of the present invention with a subscriber terminal in a network which is provided a service via a switching system using multiple paths from a service provider, comprising a path selecting device to select an unconnected path having a bandwidth which is largest among paths to provide a requested service; a message transmitting device to transmit a request message to set the path selected by said path selecting device to the switching system; and a received message processing device to determine whether there are any paths which have to be set, and to instruct the path selecting device to select the path having the largest bandwidth among the remaining paths to provide the service when there is any path which has to be set.

Objects and advantages of the present invention are achieved in accordance with embodiments of the present invention with a system to allocate bandwidth of requested resources, comprising a controller to simultaneously secure a bandwidth for all paths required to provide requested resources.

Objects and advantages of the present invention are achieved in accordance with embodiments of the present invention with a method of allocating bandwidth of requested resources, comprising simultaneously securing a bandwidth for all paths required to provide requested resources.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 5A and 5B are diagrams illustrating message contents in accordance with the first embodiment of the present invention.

DESCRIPTION OF THE PREFERRED EMBODIMENTS

Figure 1:
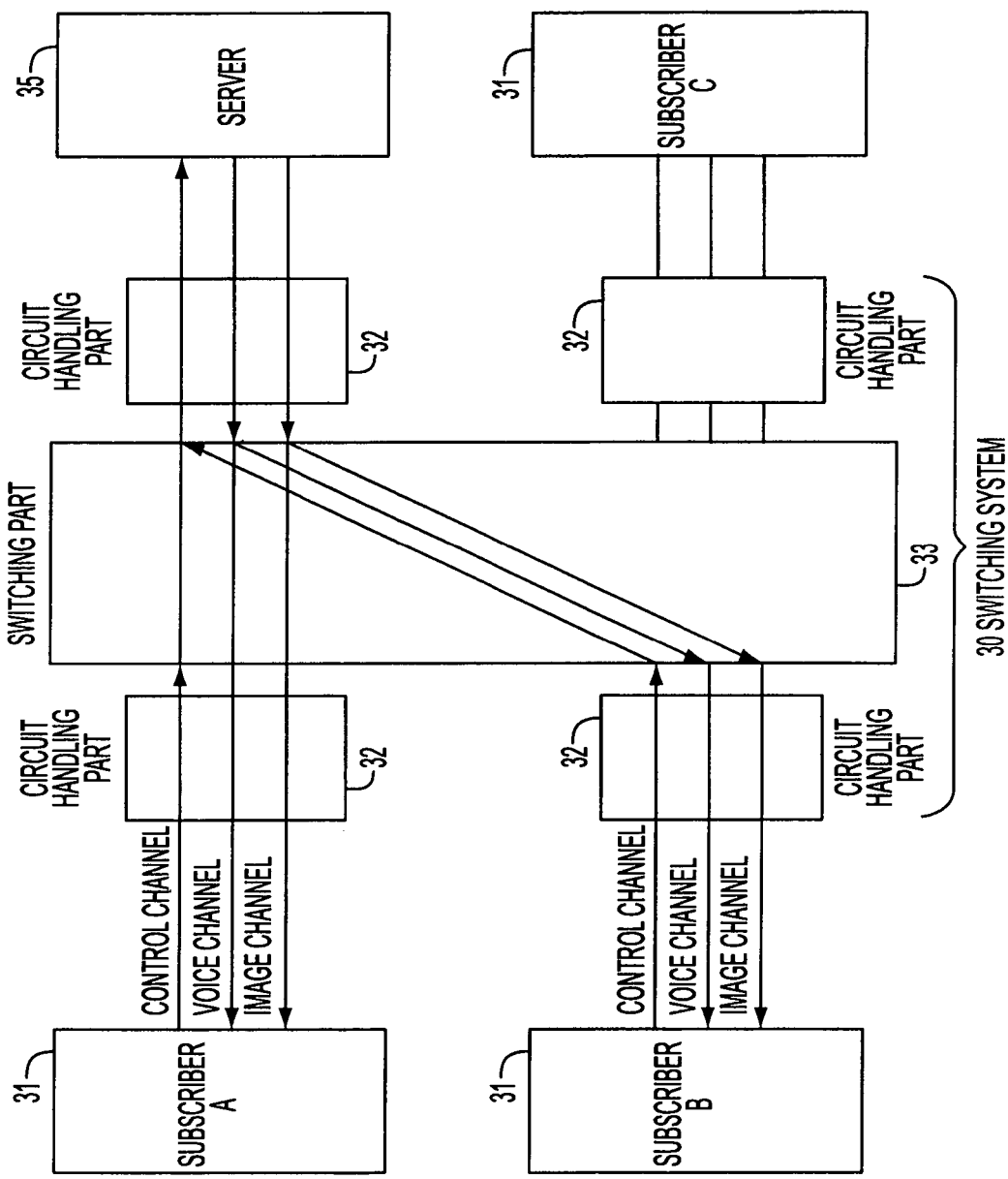
FIG. 1 is a block diagram of a prior art switching system.
Figure 2:
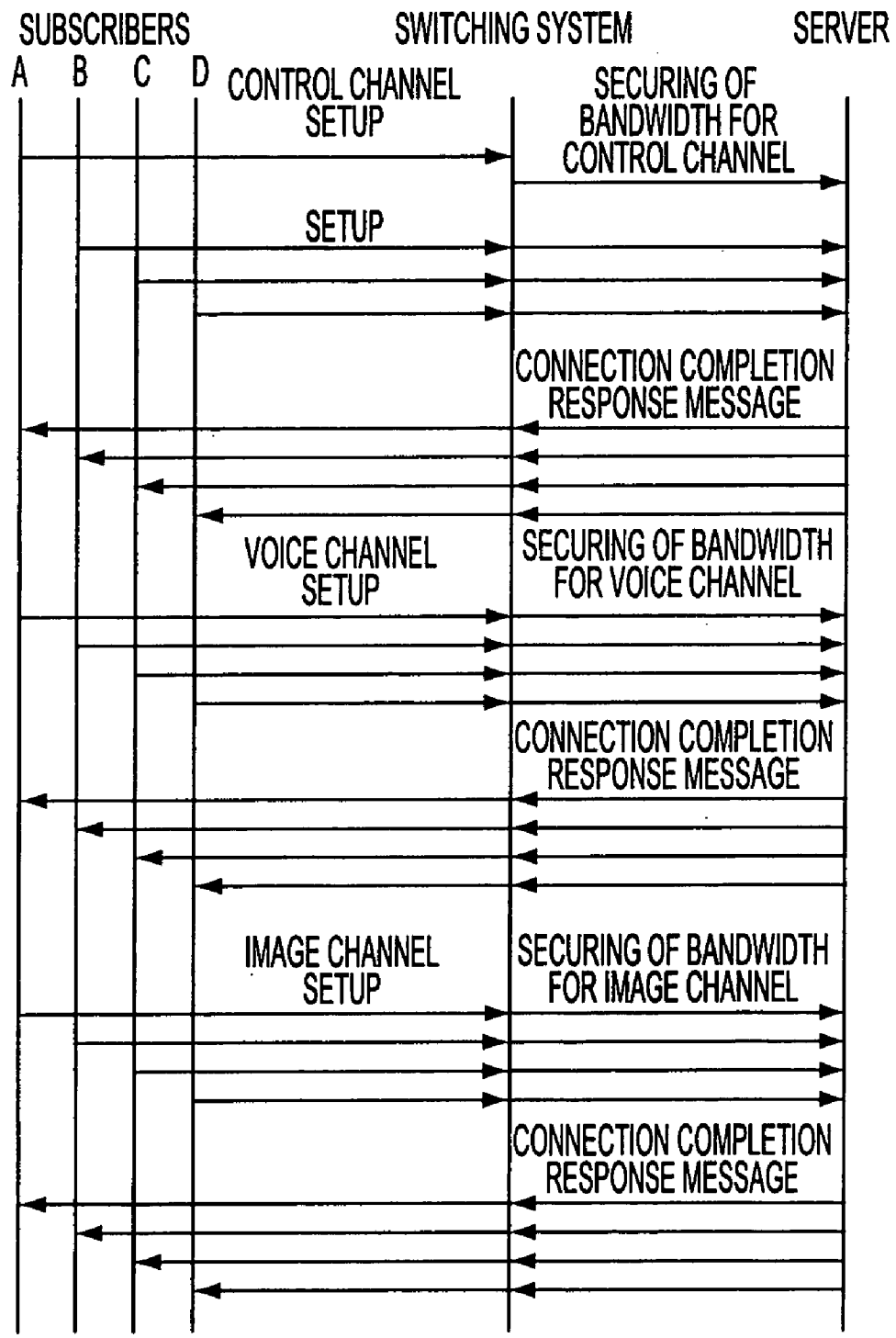
FIG. 2 is an diagram illustrating a prior art operation for securing bandwidth for channels.

Reference will now be made in detail to the preferred embodiments of the present invention, examples of which are illustrated in the accompanying drawings, wherein like reference numerals refer to like elements throughout.

Figure 3:
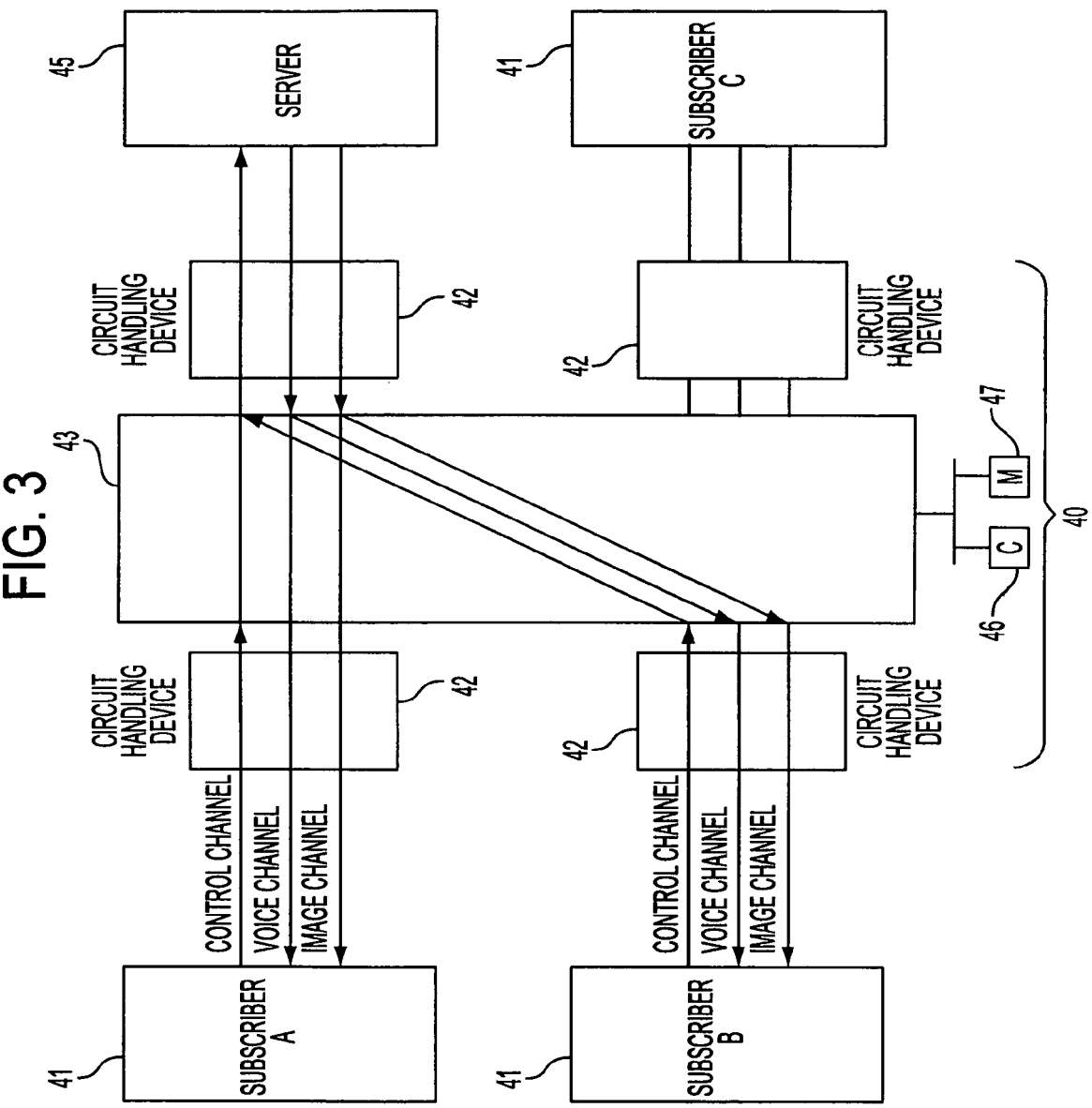
FIG. 3 is a block diagram of a communication system in accordance with embodiments of the present invention.

FIG. 3 is a block diagram of a communication system in accordance with embodiments of the present invention. As shown in FIG. 3, the communication system comprises a plurality of subscriber terminals 41, a service provider, for example server 45, and a path setting device, for example switching system 40. The switching system 40 is preferably an asynchronous transfer mode (ATM) switching system. The switching system 40 includes a switching device 43, a control unit 46, memory 47 and circuit handling devices 42. The control unit 46 is preferably a RISC processor which controls operation of the path setting device. The memory 47 is preferably RAM which stores control programs and data for operation of the path setting device. The memory 47 may also include RAM and ROM. A server 45 provides services, such as VOD service, a TV telephone, etc., requested by subscribers 41 A, B, C. The circuit handling devices 42 may include an optical-electrical exchange part to connect the subscriber 41 or server 45 by an optical transmission path. When the switching system 40 shown in FIG. 3 is an asynchronous transfer mode (ATM) switching system 40, it includes smoothing and policing functions of the ATM cell.

The switching system 40 sets the control channel, the voice channel and the image channel between subscribers 41 and the server 45 for the service provided by the server 45. Thus, for example, a VOD service, which sends the regenerated voices and images from the server 45, is provided by sending requests from subscribers 41 to server 45 via the control channel. For example, the control channel can have a 16 Kbps or a 64 Kbps bandwidth; the voice channel can have a 64 Kbps bandwidth; and, the image channel can have a 3 Mbps or a 5 Mbps bandwidth.

Figure 4:
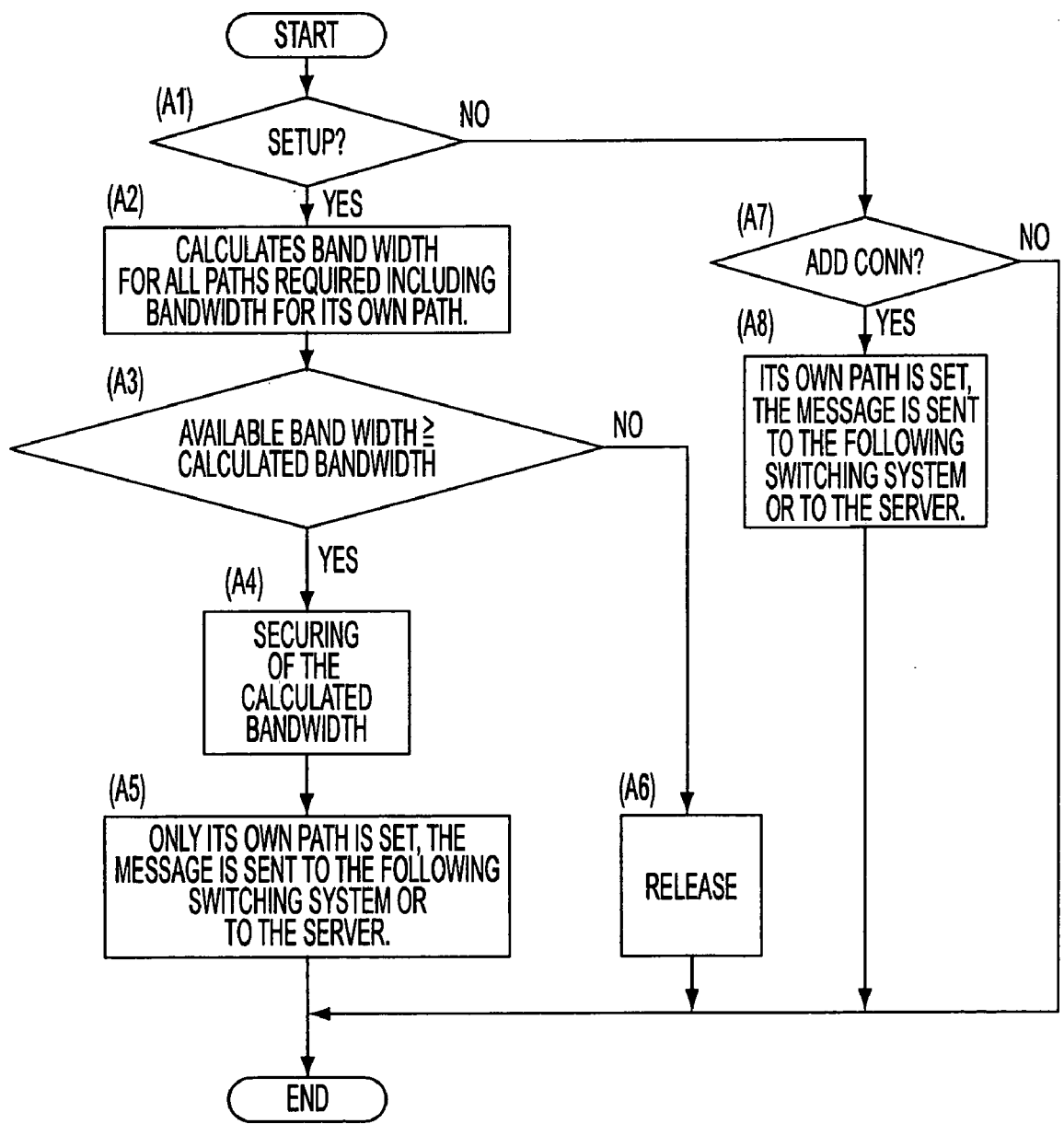
FIG. 4 is a flow chart illustrating an operational process for securing a bandwidth for providing a service in accordance with a first embodiment of the present invention.

FIG. 4 is a flow chart illustrating an operational process for securing a bandwidth with the switching system 40 shown in FIG. 3 in accordance with the first embodiment of the present invention. As shown in FIG. 4, the switching system 40 determines whether or not a received message is a SETUP message (one of the call setting requests) from a subscriber (step A1). If the received message is a SETUP message, bandwidth for all of the paths required (PA1 to PAn) is calculated, including the bandwidth of its own path (PA1), for as many paths as there are required to provide the service for the subscriber (step A2). Next, the available bandwidth and the calculated bandwidth are compared (step A3). If the calculated bandwidth is less than or equal to the available bandwidth, the calculated bandwidth is secured to provide the service (step A4). Only the path PA1 of the service subscriber A is first set by the SETUP message, and the message is then sent to a following switching system 40 or to the server 45 (step A5). If the calculated bandwidth is more than the available bandwidth, a path setting can not be made, and the subscriber is released (step A6).

In step A1, if it is determined that the message type is not a SETUP message, the operational process proceeds to step A7, where it is determined whether the message type is an ADD CONN message. If, in step A7, the message is not an ADD CONN message, then the message is neither the SETUP message nor the ADD CONN message, and the operational process shown in FIG. 4 ends. However, if it is determined that the message type is an ADD CONN message, a setting is made for the paths PA2 through PAn. The message is then sent to a following switching system 40 or server 45.

FIGS. 5A and 5B are diagrams illustrating the contents of the SETUP message and ADD CONN message, respectively, in accordance with the first embodiment of the present invention. More particularly, FIG. 5A illustrates the contents of a SETUP message for a first path, and FIG. 5B illustrates the contents of an ADD CONN message, which is distinguished from the SETUP message, for a second path and succeeding paths. Both the SETUP message and the ADD CONN message are call setting request messages. As shown in FIG. 5A, the SETUP message includes an indication (SETUP) of the message type, the call number, the number of paths n required to provide the service for a subscriber, and a transmission capacity descriptor, i.e., the requested bandwidth information, when it is suitable for the ATM switching system 40. The transmission capacity descriptor (the requested bandwidth information) is sent from the subscriber and comprises a peak cell rate (PCR), a sustainable cell rate (SCR), a maximum burst size (MBS), a cell delay variation (CDV) and others for the path PA1 (path set by the SETUP message for a first path) and for the paths PA2 to PAn set by the ADD CONN messages for the second through the nth paths, which corresponds to the number of paths.

The ATM switching system 40 transmits ATM cells having a format comprising fifty-three (53) bytes with a header field of five (5) bytes and an information field of forty-eight (48) bytes. In FIGS. 5A and 5B, only the information field is shown and the header field is omitted. A common mode is used to report the requested bandwidth for the subscribers when they call in. Thus, a bandwidth in accordance with the transmission capacity descriptor is reported from the subscriber. A constant bit rate mode (CBR), a variable bit rate mode (VBR), available bit rate mode (ABR), and other types of modes, are well known as means of securing bandwidth according to the requested bandwidth. A mode which sets quality of service (QOS), which is the transfer quality when the service is provided, may also be applied to secure the bandwidth.

After the SETUP message shown in FIG. 5A has been sent to the switching system 40, ADD CONN messages, as shown in FIG. 5B, are sent successively corresponding to paths PA2 through PAn. As shown in FIG. 5B, the message type is ADD CONN to distinguish it from the SETUP message. The call number of the ADD CONN message and the call number of the SETUP message are made the same. PCR, SCR, MBS, CDV . . . and the like are set in accordance with PA2 through PAn. However, PCR and SCR and the like, which are related to each of the paths, may be omitted in the case of the ADD CONN messages, because they have already been sent. When the service provided is the same type and a bandwidth corresponding to the path is fixed beforehand, the requested bandwidth can be set by setting the type of path.

Referring to FIG. 4, in step A1, the determination of whether or not a received message is a SETUP message is made by using, for example, the indication of message type (i.e., SETUP or ADD CONN) of the message as shown in FIGS. 5A and 5B. Then, if the message type is SETUP, the operational process continues in step A2. When the number of paths n required to provide the service for a subscriber is, for example, three (3), when setting a control channel having a bandwidth of 64 Kbps, a voice channel having a bandwidth of 64 Kbps and an image channel having a bandwidth of 3 Mbps, as was described hereinabove, the bandwidth for all of the paths is 3.128 Mbps. Furthermore, the bandwidth for all of the paths can be calculated based on PCR, SCR, MBS and other parameters which correspond to the paths PA1 through PAn of number of paths n of the SETUP message. The above-described method of calculating the bandwidth can be applied for a variety of means which have already been proposed for ATM switching systems 40 and the like.

After comparing the available bandwidth between the switching system 40 and the server 45 to the calculated bandwidth in step A3, the calculated bandwidth is secured to provide the service (step A4) if the calculated bandwidth is less than or equal to the available bandwidth. Then, only the path of the SETUP message is set (step A5). The control channel is set in accordance with the above-described operations. If the calculated bandwidth is more than the available bandwidth, a path setting can not be made, the subscriber is notified that the path can not be set, and the subscriber is released (step A6).

In step A1, if the message type is not SETUP, it is then determined whether or not the message type is ADD CONN (step A7). If the message type is not ADD CONN, the message is neither the SETUP message nor the ADD CONN message, and the operational process shown in FIG. 4 ends.

If the message type is an ADD CONN message as shown in FIG. 5B, a setting is made only for the paths corresponding to the paths PA2 through PAn (step A8). The message is then sent to a following switching system 40 or server 45.

In accordance with the first embodiment of the present invention described hereinabove, the bandwidth which is required for all of the multiple paths set to provide the service for a subscriber is secured beforehand by the SETUP message. Therefore, the available bandwidth between the switching system 40 and the server 45 is effectively allocated, and service can be efficiently provided, even if the subscribers call at the same time.

Figure 6:
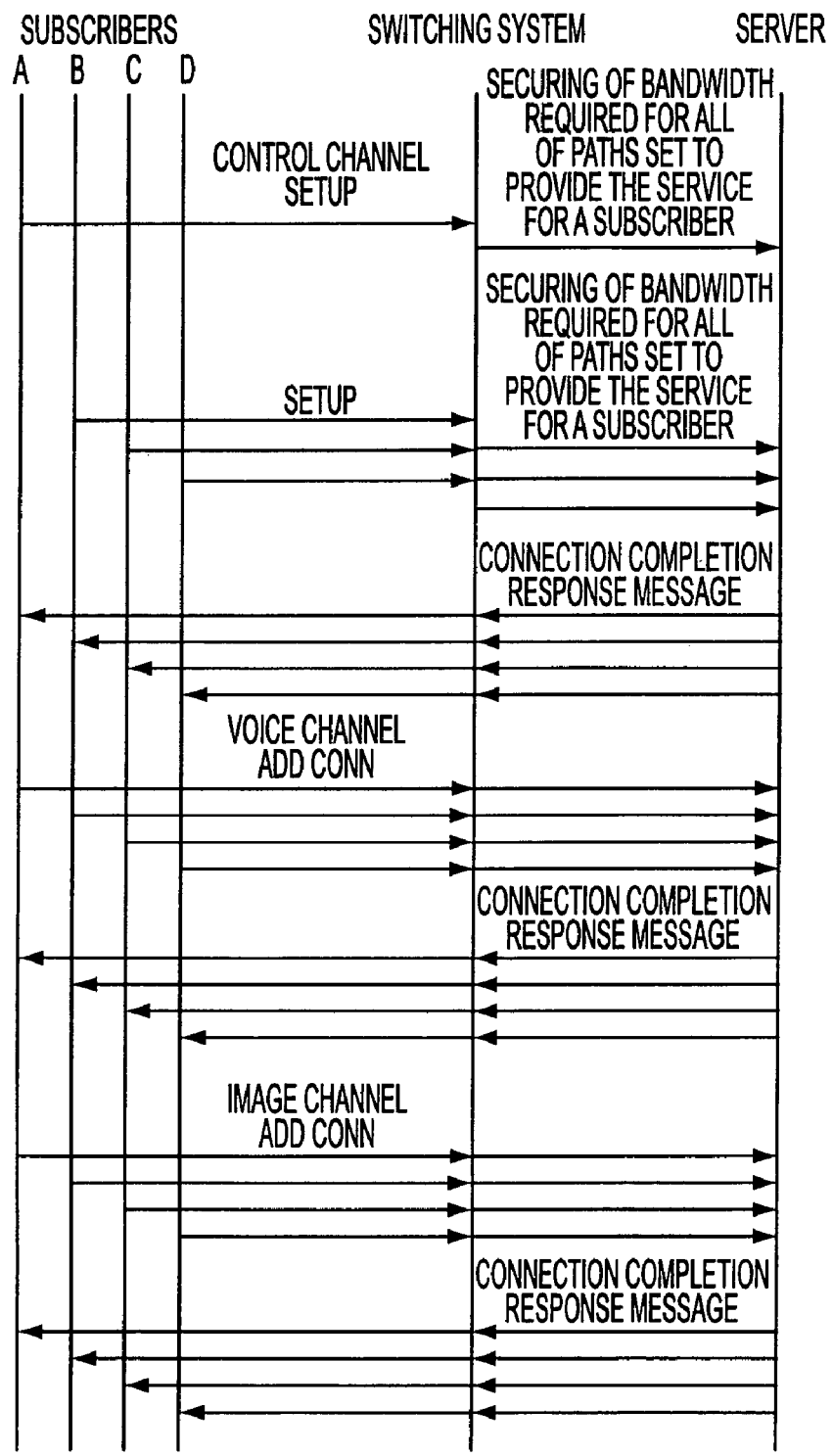
FIG. 6 is a diagram illustrating an operation for securing bandwidth for channels in accordance with the first embodiment of the present invention.

FIG. 6 is an explanatory diagram illustrating operation for securing bandwidth for channels in accordance with the first embodiment of the present invention. As shown in FIG. 6, the subscribers A, B, C, D, the switching system 40 and the server 45 are represented by vertical lines. When subscriber A sends a SETUP message to initiate the control channel setting, the switching system 40 secures a bandwidth which is required for all of the multiple paths set to provide the service for the subscriber A by using the SETUP message. For example, 3.128 Mbps is secured and the message is sent to the server 45. The switching system 40 operates in the same manner for the SETUP message from other subscribers B, C and D. At this time, the available bandwidth and the calculated bandwidth are compared, and a determination is made regarding whether or not the bandwidth can be secured. When the calculated bandwidth can be secured, the operation moves on to the next step. When the calculated bandwidth cannot be secured, a message is sent to the subscriber at the point that the path setting cannot be made.

When the bandwidth can be secured for the SETUP message from the subscribers A, B, C and D, a connection complete response message is sent from the server 45 to respective subscribers A, B, C and D. Then, an ADD CONN message is sent to initiate the voice channel setting. Because the switching system 40 has already secured the bandwidth, the ADD CONN message is sent to the server 45. Then, when respective connection complete responses to subscribers A, B, C and D are received, an ADD CONN message is sent to initiate the image channel setting. Even in this case, the switching system 40 has already secured the bandwidth, so the ADD CONN message is sent to the server 45. Then, when respective connection complete responses from the server 45 to subscribers A, B, C and D are received, each of the subscribers A, B, C and D have the path setting made for the bandwidth required between them and the server 45. Therefore, the desired image can be requested from the control channel.

Figures 7A, 7B:
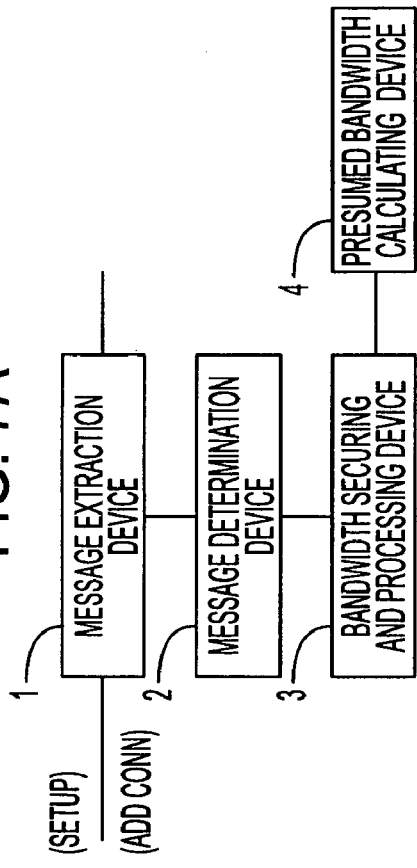
FIG. 7A is a block diagram of the main components of a switching system in accordance with the first embodiment of the present invention.
FIG. 7B is diagram of a table containing information to secure bandwidth in accordance with the first embodiment of the present invention.

FIG. 7A is a block diagram of the main components switching system 40 in accordance with the first embodiment of the present invention. As described above, the switching system 40 is preferably an ATM switching system 40, and FIG. 7A illustrates the main functional parts of the ATM switching system 40. As shown in FIG. 7A, the switching system 40 includes a message extraction device 1 to extract a variety of messages from the subscribers, and a message determination device 2 to make a determination of the type of message (SETUP or ADD CONN). The call number, the number of paths, a virtual path identifier (VPI) and a virtual channel identifier (VCI) in the header field of the ATM cell and the requested bandwidth are sent to a bandwidth securing and processing device 3 when a determination has been made for the SETUP message.

The bandwidth securing and processing device 3 accesses a Table 1, as shown in FIG. 7B, which is stored in memory 47, and includes the number of paths, the VPI/VCI, the requested bandwidth, the presumed bandwidth, the total presumed bandwidth and the available bandwidth to correspond to the call number. In this case, the requested bandwidth, that is PCR, SCR, MBS (traffic parameters) and QOS are transmitted from a subscriber. A presumed bandwidth calculating device 4 calculates the presumed bandwidth for each path from the requested bandwidth. In case that the call number three (3) is allocated to three paths, the presumed bandwidth calculating device 4 calculates 110 cell/sec for the presumed bandwidth based on QOS=1 and PCR=100 for the first path (0/32), 267 cell/sec for the presumed bandwidth based on QOS=0, PCR=10000, SCR=200 and MBS=100 for the second path (0/33), 7000 cell/sec for the presumed bandwidth based on QOS=3, PCR=10000, SCR=100 and MBS=100 for the third path (0/34). As a result, the total presumed bandwidth required at the service is 3.128 Mbps.

More specifically, (110 cell/sec+267 cell/sec+7000 cell/sec=7377 cell/sec, 7377 cell/sec=7377×8(bits)×53(octets) =3,127,848 bps=3.127848 Mbps).

Then, the calculated bandwidth and the available bandwidth are compared and a determination is made regarding whether or not the bandwidth required to provide the service can be secured. If the calculated bandwidth cannot be secured, a connection disable message is sent to the subscriber, and the subscriber is released. In this case, the calculated bandwidth (3.128 Mbps) is less than the available bandwidth (146.872 Mbps), and the calculated bandwidth (3.128 Mbps) is allocated to provide the service. The presumed bandwidth is also calculated with respect to the call number four (4), which is allocated to three paths in the same manner as call number three (3). In other words, when a SETUP message has been received, the ATM switching system 40 secures the bandwidth required to provide the service corresponding to the subscriber (call number).

In systems in which a variety of services are combined, the type of service is included in the SETUP message. If the type of service is a VOD service, the bandwidth is calculated as described previously. If the type of service is another service, the bandwidth corresponding to the other type of service is calculated, or the Table 1 is formed based on the requested bandwidth. Then, if the calculated bandwidth is more than the available bandwidth, the bandwidth cannot be secured and a connection disable message is sent to the subscriber from a message transmission device (not shown in FIG. 7). If the calculated bandwidth is less then or equal to the available bandwidth, the bandwidth required to provide the service can be secured and a message is sent to the following switching system 40 or to the server 45.

Figure 8:
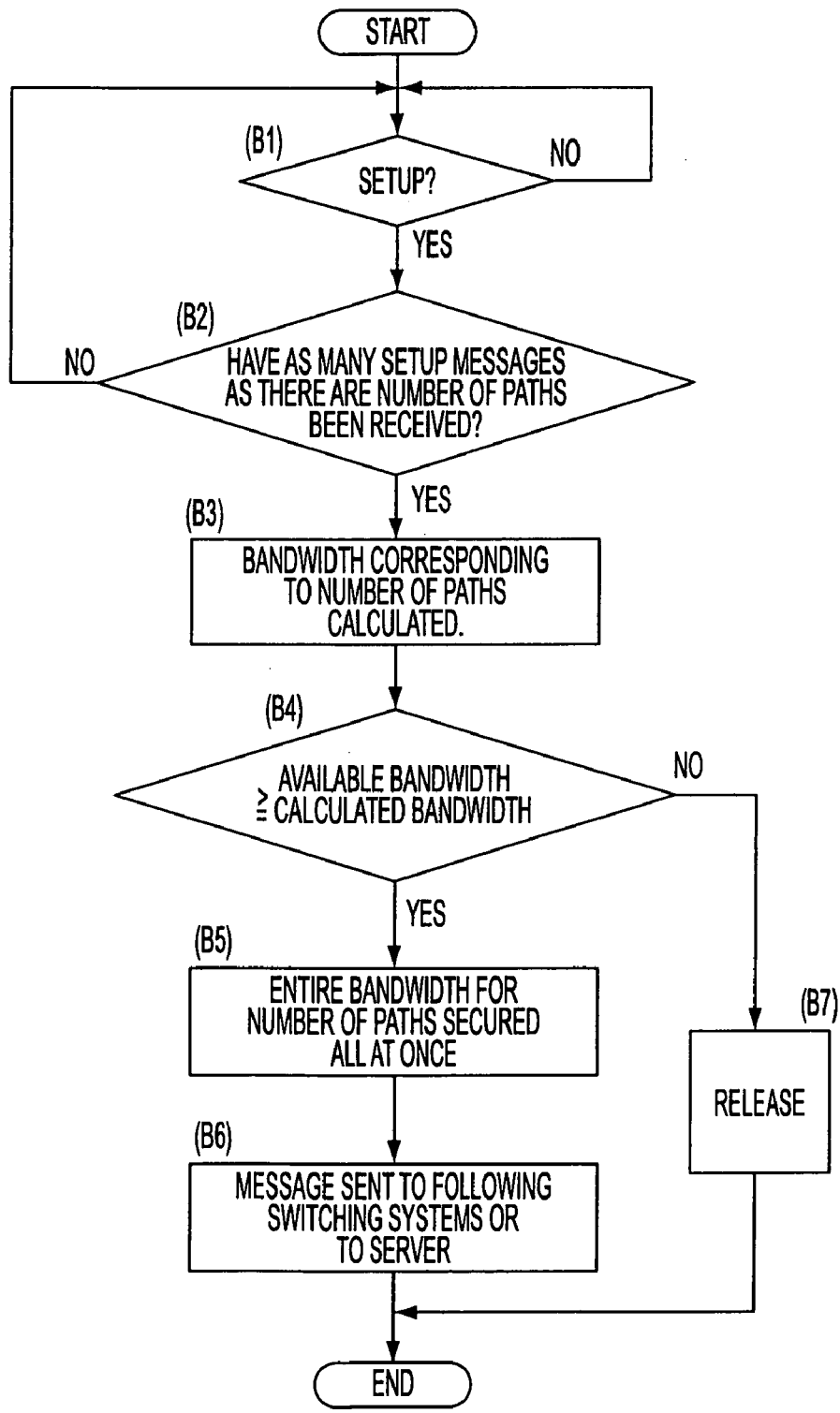
FIG. 8 is a flow chart illustrating an operational process for securing a bandwidth in accordance with a second embodiment of the present invention.

FIG. 8 is a flow chart of an operational process for path setting in accordance with a second embodiment of the present invention. As shown in FIG. 8, in step B1, the switching system 40 determines whether or not a SETUP (call setting request) message is received from the subscriber. Since the number of paths required to provide the service for the subscriber is set in the SETUP message for a first path, as described previously, a determination is made whether or not as many SETUP messages have been received as there are number of paths (step B2). If the same number of SETUP messages have been received as there are number of paths, the entire bandwidth corresponding to the number of paths is calculated (step B3). Next, the available bandwidth and the calculated bandwidth are compared (step B4).

If the available bandwidth is less than the calculated bandwidth, the path setting cannot be made, and a connection disable message is sent to the subscriber to release the subscriber (step B7). If the available bandwidth is more than or equal to the calculated bandwidth, the path setting can be made, and the entire bandwidth for the number of paths is secured (step B5). The message is then sent to the following switching system 40 or to the server 45 (step B6).

Figure 9A:
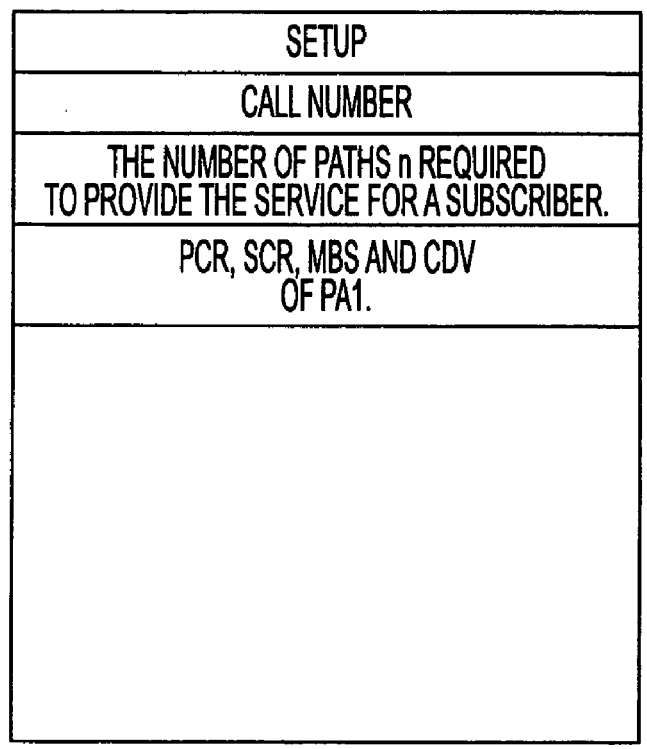
FIGS. 9A and 9B are diagrams illustrating message contents in accordance with the second embodiment of the present invention.
Figure 9B:
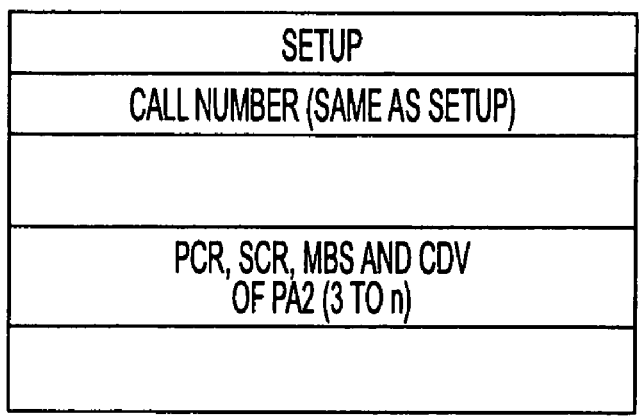

FIGS. 9A and 9B are diagrams illustrating the contents of the SETUP message in accordance with the second embodiment of the present invention. More specifically, FIG. 9A illustrates a SETUP message for a first path, and FIG. 9B illustrates the SETUP messages for a second path and succeeding paths. The type of message is SETUP in all cases. The number of paths n required to provide the service for a subscriber, and the PCR, SCR and MBS of the path PA1 for which the first setting is required are set in the SETUP message for a first path (PA1). The SETUP messages for the second and succeeding paths include the same call number as the call number in the SETUP message for a first path, and the PCR, SCR and MBS, which correspond to the paths PA2 through n for the second path and succeeding paths.

Figure 10:
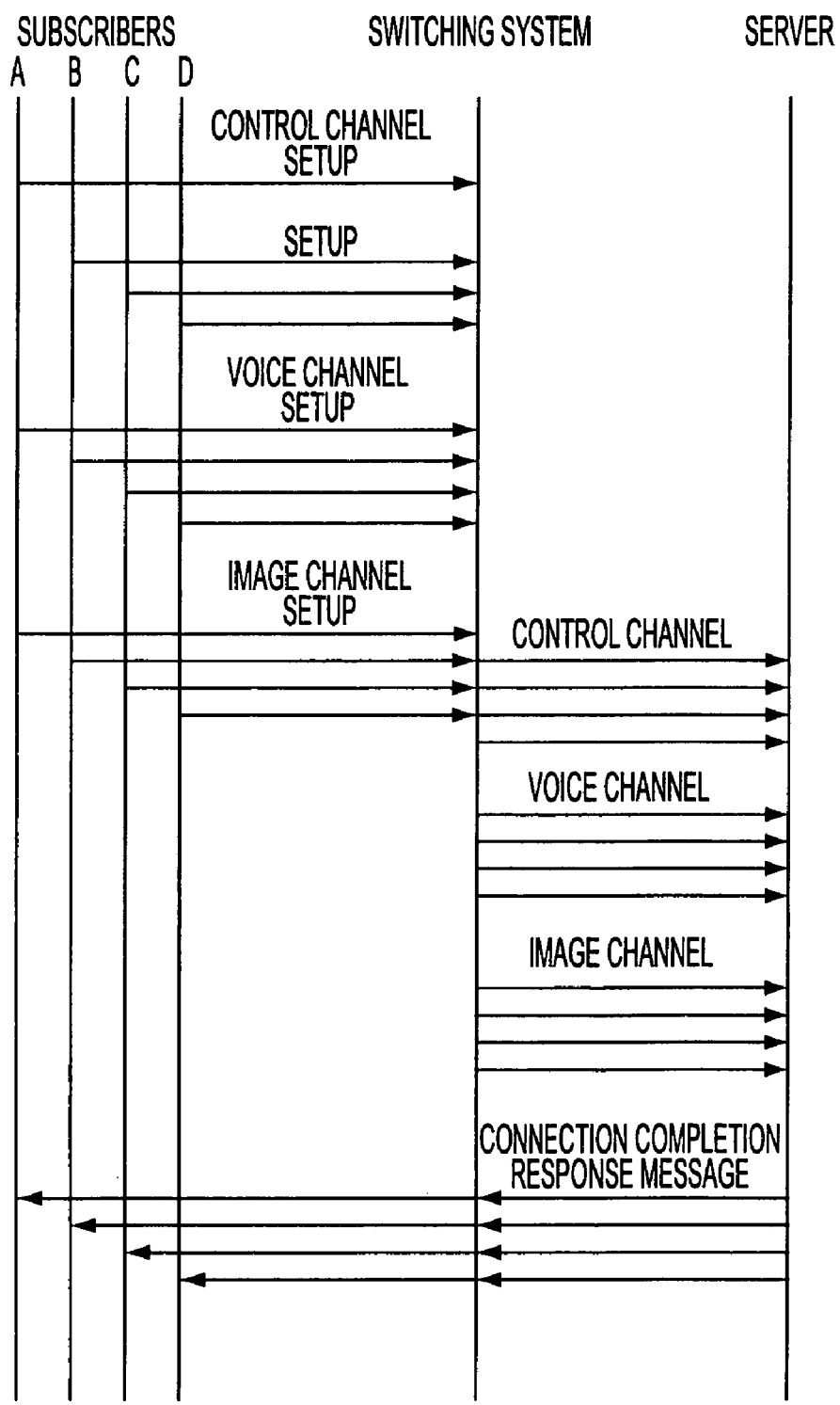
FIG. 10 is a diagram illustrating an operation for securing a bandwidth for channels in accordance with the second embodiment of the present invention.

FIG. 10 is a diagram illustrating an operation for securing a bandwidth for channels in accordance with the second embodiment of the present invention. As shown in FIG. 10, the subscribers A, B, C and D, the switching system 40 and the server 45 are indicated with vertical lines. When the respective SETUP messages for the control channel, the voice channel and the image channel are received from subscribers A, B, C and D, the switching system 40 receives the first through the third messages indicated as number of paths n=3 by the SETUP message for a first path (PA1). Then, the bandwidth is calculated and the available bandwidth is compared with the calculated bandwidth. If the calculated bandwidth is less than or equal to the available bandwidth, then the calculated bandwidth is secured all at once. The messages are sent successively to the server 45 from the switching system 40. The subscriber receives a connection completion message from the server 45, so a variety of requests are sent via the control channel.

In accordance with the second embodiment of the present invention, as many SETUP messages as there are paths requested by the subscriber are received at the switching system 40. The bandwidth required to provide the service is calculated, a determination is made whether or not a path setting can be made using the calculated bandwidth, and the paths are set all at once when the setting can be made. In accordance with the second embodiment of the invention, an advantage is provided in that the situation wherein only one part of the request for multiple paths to provide a service is set, while the remaining part of the paths cannot be set, is avoided.

Figure 11:
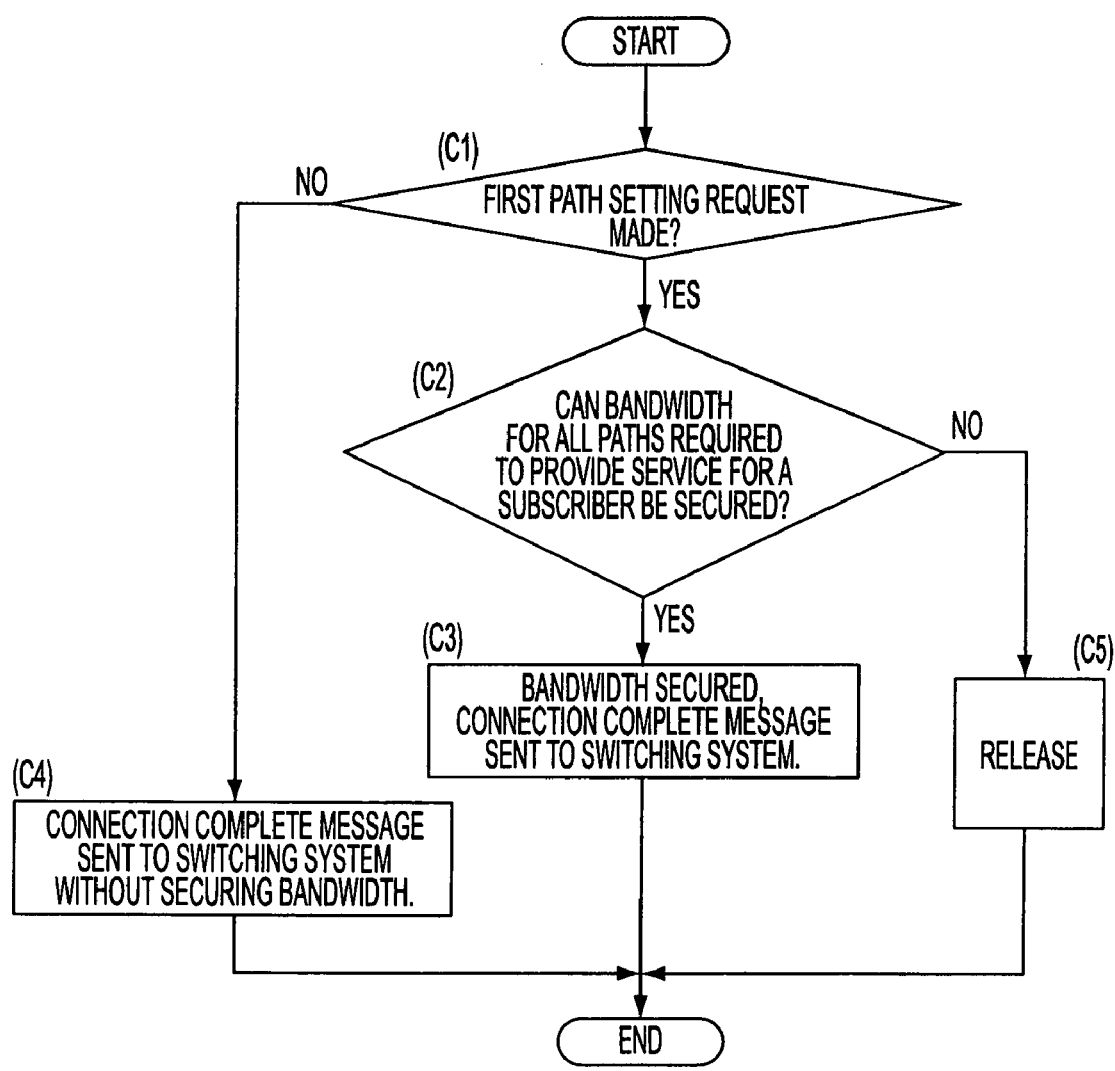
FIG. 11 is a flow chart illustrating an operational process for securing on bandwidth in accordance with a third embodiment of the present invention.

FIG. 11 is a flow chart of an operational process in accordance with a third embodiment of the present invention. More specifically, FIG. 11 illustrates an operational process performed by the service provider, that is, the server 45. As shown in FIG. 11, first, a determination is made whether or not a first path setting request is made from the switching system 40 (step C1). If it is determined that a first path setting request has been made in step C1, then a determination is made whether or not a bandwidth for all of the paths required to provide the service for a subscriber can be secured (step C2). In other words, the server 45 can understand the required bandwidth between the subscriber and the switching system 40 based on the service provided at the point that the first path request is received from the subscriber, and the available bandwidth can be obtained without difficulty. Because the server 45 is supposed to set three paths; the control channel having a bandwidth of 64 Kbps, the voice channel having a bandwidth of 64 Kbps, and the image channel having a bandwidth of 3 Mbps to provide the VOD service for a subscriber. As a result, if the server 45 receives a new path setting request, a determination as to whether or not the bandwidth for all of the paths can be secured can be easily made. Therefore, the call setting messages used in accordance with the third embodiment of the present invention can be the same as the call setting messages in the prior art.

Then, if the bandwidth can be secured, a connection complete message is sent to the switching system 40 (step C3). If the bandwidth can not be secured, a connection disable is reported to the switching system 40 and is released (step C5). If there is a second and succeeding path setting request, a connection complete message is sent to the switching system 40 without securing the bandwidth (step C4). As a result, if the bandwidth cannot be secured on calling to the server 45, a connection disable report is made immediately after a first SETUP message is sent and is released. Therefore, the invalid hold time can be significantly shortened and the resources of the network can be used to their best advantage. A function can be added to the server 45 alone without any special function having to be added to the switching system 40, even for a preexisting switching system 40, so that the path setting control can be performed as described above.

Figure 12:
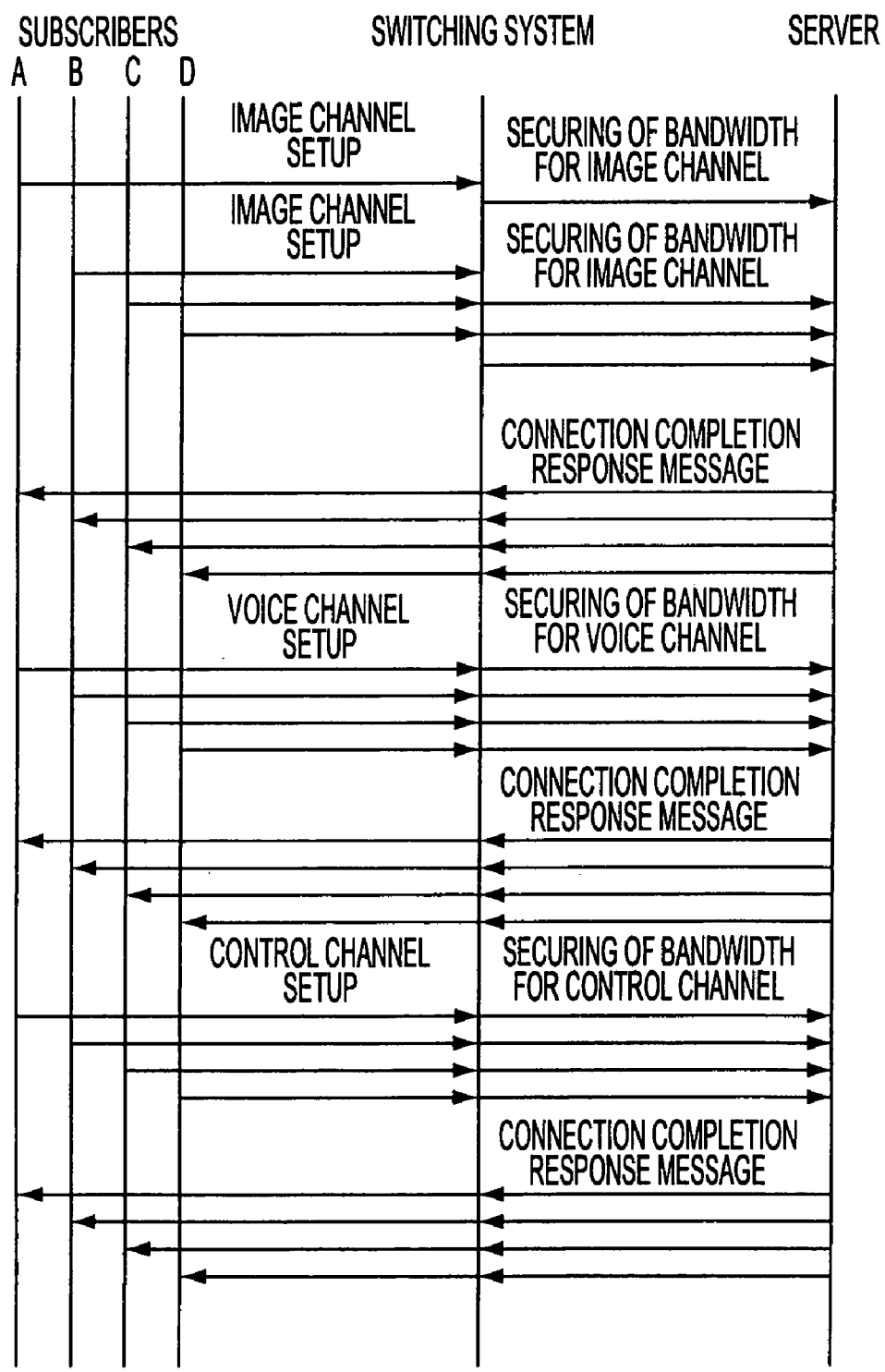
FIG. 12 is a diagram illustrating an operation for securing bandwidth for channel in accordance with a fourth embodiment of the present invention.

FIG. 12 is an explanatory diagram of operation for securing a bandwidth for channels in accordance with a fourth embodiment of the present invention. As shown in FIG. 12, the subscribers A, B, C and D, the switching system 40 and the server 45 are indicated with vertical lines. Subscribers A, B, C and D send SETUP (call setting request) messages to the switching system 40 in order secure the bandwidth from large to small of the various bandwidth for paths required to provide the service. For example, subscriber A sends the SETUP messages for the image channel (3 Mbps) at the beginning. Next, the subscriber A sends the SETUP messages for the voice channel (64 Kbps) and then the SETUP messages for the control channel (64 Kps).

The switching system 40 secures bandwidth for the various SETUP messages from subscribers A, B, C and D and sends the respective messages to the server 45. As a result, by first setting a bandwidth, such as that required by the image channel, there is a greater possibility of avoiding a situation wherein the available bandwidth disappears when a bandwidth smaller than the voice channel and the control channel is set. As a result, when there are multiple paths required to provide the same service, the possibility of setting a path in the switching system 40 is greater and an available bandwidth can be allocated even when the subscribers make a call setting request at the same time.

For example, if the image channel having a bandwidth of 3.2 Mbps is set first when the available bandwidth is 30 Mbps, an allocation can be made to nine subscribers. At that time, the available bandwidth is 1.2 Mbps. Then, if the voice channel and control channel having bandwidth of 64 Kbps are allocated to nine subscribers, the total bandwidth is 1.152 Mbps. Therefore, the available bandwidth is 0.048 Mbps. In other words, if the control channel and voice channel having respective bandwidth of 64 Kbps are allocated first, they can be allotted to 234 subscribers. However, the available bandwidth is 0.048 Mbps and any image channel having a bandwidth of 3.2 Mbps cannot be allocated, although by making setting requests in order of large bandwidth to small bandwidth, the service can be provided to a maximum of subscribers within the available bandwidth.

In accordance with the fourth embodiment of the present invention, the configuration of the switching system 40 and the server 45 need not be changed, and the configuration of subscribers A, B, C and D is changed and SETUP messages are sent in order of large bandwidth to small bandwidth, so that an available bandwidth can be used effectively and allocated to a subscriber without increased operations costs.

Figure 13:
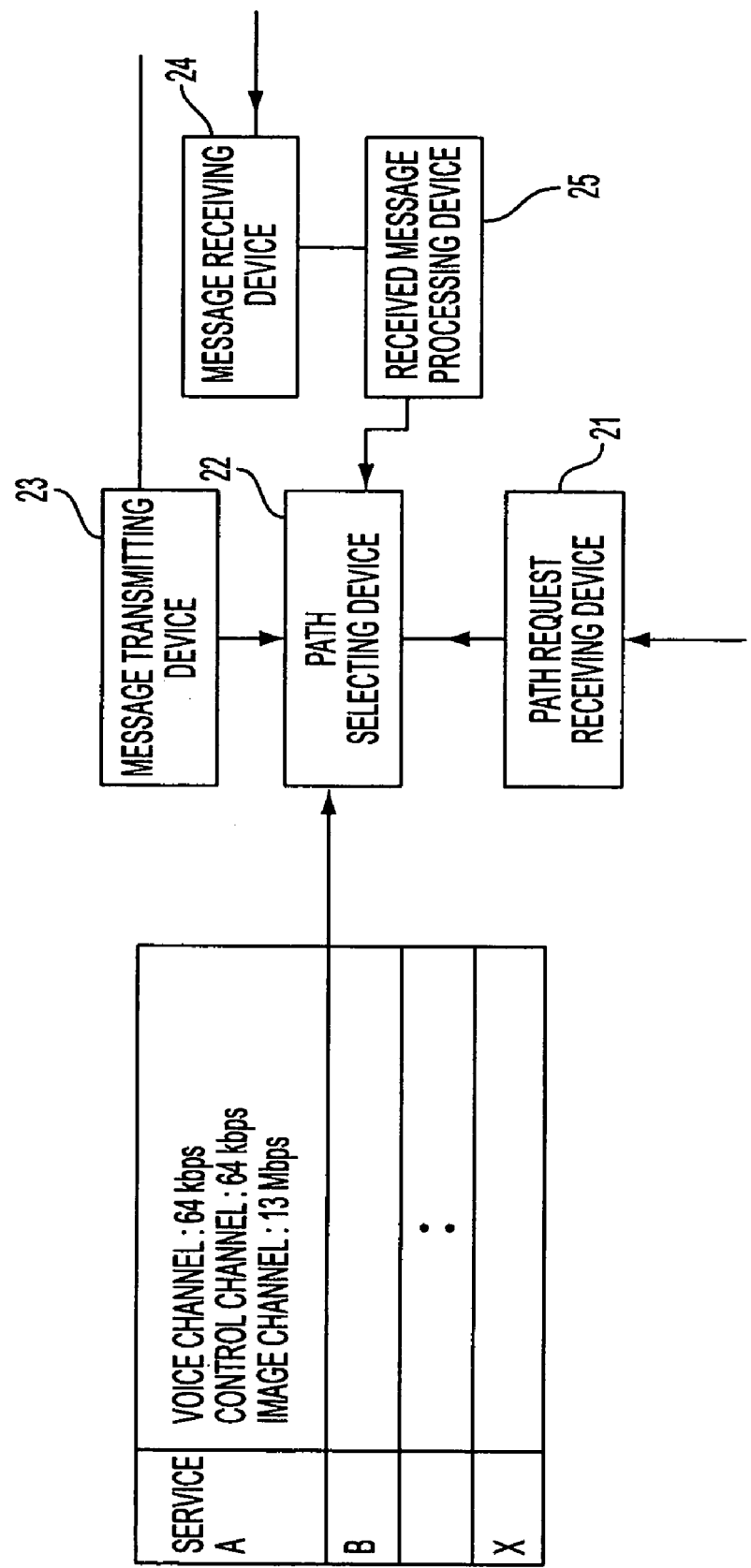
FIG. 13 is a block diagram of a subscriber terminal in accordance with the fourth embodiment of the present invention.

FIG. 13 is a block diagram of a subscriber terminal in accordance with a fourth embodiment of the present invention. As shown in FIG. 13, a path request receiving device 21 instructs a path selecting device 22 to process the service requested by the subscriber. The path selecting device 22 selects the unconnected path whose bandwidth is the greatest among the service requested and sends the request to set the path to the message transmitting device 23. For example, the service A needs the control channel having a bandwidth of 64 Kbps, the voice channel having a bandwidth of 64

Kbps and the image channel having a bandwidth of 13 Mbps. If a subscriber requests the service A, the path selecting device 22 selects the image channel having a bandwidth of 13 Mbps and requests to set the channel. The message transmitting device 23 transmits the call setting message for the image channel to the switching system 40. On the other hand, when the message receiving device 24 receives the message from the switching system 40, the message receiving device 24 sends it to the received message processing device 25. Then the received message processing device 25 determines whether or not there are any paths which have to be set. If there are some paths which have to be set, the received message processing device 25 instructs the path selecting device 22 to set the path having the largest bandwidth of the available paths required to provide the service. In this case, either the voice channel or the control channel may be selected as the path which is set for next path because the bandwidth of these channels is the same. If setting of all of the paths has been completed, the received message processing device 25 terminates without doing anything.

The present invention is not limited to the embodiments of the invention described above, and a variety of additions or modifications may be made. For example, the description above has focused chiefly on application to ATM switching systems 40; however, paths with the same or different bandwidth may be set and may be applied to a variety of switching systems 40 which can provide services. Further, the present invention is also applicable to a system which performs all processing in terms of optical signals.

As described hereinabove, the present invention provides a path setting device including a switching system 40 which receives a SETUP message for a first path and which sets the requested bandwidth information in a system which offers a service, such as video-on-demand, to a subscriber from a server 45 via the switching system 40 by setting multiple paths. The switching system 40 makes it possible to set multiple paths between the server 45 and the subscribers in a sequence whereby the SETUP messages are sent to correspond to available bandwidth, even if a larger number of subscribers call in at the same time, by securing a bandwidth which corresponds to the number of paths between the server 45 and the subscribers, and available bandwidth can be used effectively.

The switching system 40 in accordance with the present invention is advantageous in that it avoids the problem of the prior art, wherein only one part of the request for multiple paths to provide the service can be set but the other part of the request for multiple paths to provide the service cannot be set. More particularly, the above problem is avoided because the available bandwidth between the server 45 and the subscribers is secured and the bandwidth is secured all at once when as many SETUP messages as there are paths are received. Furthermore, if the available bandwidth is insufficient when the bandwidth is secured, all of the settings which correspond to the subscribers are rejected.

In accordance with the present invention, by securing the bandwidth required to provide the service when the first call setting request message is received from the switching system 40 by the server 45, the preexisting switching system 40 can advantageously be used, and a condition wherein only a part of the paths can be set at path setting time is avoided.

The present invention is advantageous in that by taking the sequence of SETUP messages sent from the subscribers in order of large bandwidth to small bandwidth, the number of subscribers whose bandwidth can be secured between the switching system 40 and the server 45 can be restricted. Sequential allocation can be carried out by making the required bandwidth small even if the available bandwidth is reduced, so the available bandwidth can be used effectively and allocated to subscribers.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A path setting device to secure for a subscriber bandwidth for a plurality of paths that are to be used together to carry data to provide an application service from a service provider to the subscriber, comprising:

means for determining whether a received message is a request message for a first path of the plurality of paths, the request message including first bandwidth information for the first path of the plurality of paths and second bandwidth information for a second path of two or more paths of the plurality of paths used for carrying the data of the application service required by the subscriber;

means for securing the plurality of paths and a bandwidth for the plurality of paths based on the bandwidth information of the two or more paths in the request message for the first path between the service provider and the subscriber, where the securing is in response to receiving the request message for the first path;

means for determining whether the received message is a following request message for a remaining path in which information identifying the request message for the first path is set; and means for setting the remaining path between the service provider and the subscriber in response to the following request message for the remaining path.

2. A path setting device as recited in claim 1, further comprising:

means for calculating a bandwidth required for all paths set to provide the service for a subscriber based on the requested bandwidth information set in the request message for the first path from the subscriber;

means for comparing the calculated bandwidth to an available bandwidth between the service provider and the subscriber;

means for securing the calculated bandwidth if the calculated bandwidth is less than or equal to the available bandwidth;

means for setting the first path between the service provider and the subscriber in response to the request message for the first path; and means for notifying that it is impossible to set a path to the subscriber if the calculated bandwidth is larger than the available bandwidth.

3. A path setting device as recited in claim 1, wherein the information identifying the request message is a call number.

4. A path setting device as recited in claim 2, wherein the information identifying the request message is a call number.

5. A path setting control method of securing for a subscriber bandwidth for a plurality of paths that are to be used together to carry data to provide an application service from a service provider to the subscriber via a switching system, comprising:

sending a request message for a first path of the plurality of paths from the subscriber to the switching system, a request message including first bandwidth information for the first path and second bandwidth information for a second path of two or more paths of the plurality of paths used to carry the data and to thereby provide the application service for the subscriber;

securing the plurality of paths and a bandwidth for the plurality of paths based on the bandwidth information of the two or more paths in the request message for the first path between the service provider and the subscriber, where the securing is in response to the request message for the first path being received at the switching system;

setting the first path in response to the request message for the first path between the service provider and the subscriber; and setting a remaining path in response to a following request message for the remaining path between the service provider and the subscriber.

6. A switching system for setting for a subscriber a plurality of paths that are to be used together to carry data to provide an application service provided from a service provider to the subscriber, comprising:

an extraction device to extract messages from subscribers;

a message determination device to determine whether a message extracted by the message extraction device is a request message for a first path of two or more paths of the plurality of paths between the service provider and the subscriber, the request message including first bandwidth information for the first path and second bandwidth information for a second path of the plurality of paths for carrying the data of the application service; and a bandwidth securing and processing device to secure the plurality of paths and a bandwidth for the plurality of paths based on the bandwidth information of the two or more paths in the request message in response to receiving the request message for the first path.

7. A switching system as recited in claim 6, further comprising:

a presumed bandwidth calculating device to calculate a presumed bandwidth for each respective path based on the requested bandwidth information set in the request message, and to calculate a total presumed bandwidth based on the presumed bandwidths.

8. A switching system as recited in claim 6, wherein said bandwidth securing and processing device compares the bandwidth to the available bandwidth, and secures the bandwidth when the bandwidth is less than or equal to the available bandwidth.

9. A switching system as recited in claim 7, wherein said bandwidth securing and processing device compares the total presumed bandwidth to the available bandwidth, and secures the total presumed bandwidth when the total presumed bandwidth is less than or equal to the available bandwidth.

10. A path setting device to secure for a subscriber bandwidth for a plurality of paths that are to be used together to carry data to provide an application service from a service provider to the subscriber, comprising:

means for determining whether a received message is a request message for a first path of the plurality of paths;

means for determining whether a number of request messages received for the application service from the same subscriber reaches a number of paths indicated by the request message for the first path; and means for securing at a switching system a bandwidth required for all of the paths in the plurality of paths to provide the application service for the subscriber between the service provider and the subscriber when the number of request messages received from the same subscriber reaches the number of paths indicated by the request message for the first path.

11. A path setting control method of securing for a subscriber bandwidth for a plurality of paths that are to be used together to carry data to provide an application service from a service provider to the subscriber via a switching system, comprising:

sending a request message for a first path of the plurality of paths from the subscriber to the switching system, where a number of paths required to provide the application service for the subscriber is determined based upon the request message for the first path;

sending request messages from the same subscriber for the application service equivalent to the number of paths successively to the switching system; and securing at the switching system a bandwidth required for all of the paths in the plurality of paths to provide the application service for the subscriber between the service provider and the subscriber when the number of request messages reaches the number of paths determined according to the request message for the first path.

12. A service provider to provide a service by using multiple paths to a subscriber via a switching system, comprising;

means for receiving a request message for a first path from the subscriber via the switching system;

means for securing a bandwidth of all the multiple paths required to provide the service for a subscriber in response to receiving the request message for the first path;

means for sending a connection message to the switching system in response to a following request message for another path from the subscriber in which information identifying the request message for the first path is set; and means for setting the other path between the service provider and the subscriber in response to in response to receiving a following request message for the other path from the subscriber.

13. A path setting control method of setting multiple paths having channels, for an application service provided from a service provider to a subscriber via a switching system, comprising:

sending a plurality of request messages from the subscriber to the switching system, in order from large bandwidth to small bandwidth, to set various bandwidths which correspond to the multiple paths required to provide the application service; and securing the bandwidths required between the service provider and the subscriber in order from large bandwidth to small bandwidth in response to the request messages.

14. A subscriber terminal in a network which is provided a service via a switching system using multiple paths from a service provider, comprising:

a path selecting device to select an unconnected path having a bandwidth which is largest among paths to provide a requested service;

a message transmitting device to transmit a request message to set the path selected by said path selecting device to the switching system; and a received message processing device to determine whether there are any remaining paths which have to be set, and to instruct the path selecting device to select unconnected paths to be set of any remaining paths in order from a largest bandwidth to a smallest bandwidth among the remaining paths to provide the service when there is any path which has to be set.

15. A method according to claim 13, wherein the multiple paths correspond, respectively to different channel types, and each channel type corresponds to a type of service provided by the channel of the respective path.

16. A method of using a switching system to obtain, for a subscriber of a service provider, communication paths that together provide a given session of a type of application service provided by one or more servers of the service provider, where the type of application service is predefined to require multiple paths, the method comprising:

when initiating the given session, transmitting from a subscriber terminal a request for a first communication path corresponding to a first of the paths that are predefined to be required to provide the type of application service of the given session; and receiving the request at a switching system and in response, based on the request, securing both the first communication path and a second communication path for the given session, where the second communication path corresponds to a second of the paths that are predefined to be required to provide the type of application service of the given session, wherein the second communication path is secured by the switching system before the switching system receives from the service provider a response to the request for the first communication path or before the switching system receives from the subscriber a second request that is a request for the secured communication path.

17. A method according to claim 16, wherein the application service comprises a video on demand service, wherein the predefined paths comprise at least a media path and a control path, wherein the media path carries media data of the given session, and wherein the control path carries control data that controls the given session.

* * * * *

UNITED STATES PATENT AND TRADEMARK OFFICE
CERTIFICATE OF CORRECTION

| | | |
|---|---|---|
| PATENT NO. | : 7,142,561 B1 | Page 1 of 1 |
| APPLICATION NO. | : 09/382458 | |
| DATED | : November 28, 2006 | |
| INVENTOR(S) | : Yoshihiro Watanabe | |

It is certified that error appears in the above-identified patent and that said Letters Patent is hereby corrected as shown below:

On Title Page, Item (56)

References Cited, Other Publications, Col. 2, line 4, change "et a.," to --et al.,--

Col. 16, line 43, after "subscriber" delete "in response to" second occurrence

Signed and Sealed this

Third Day of April, 2007

JON W. DUDAS
*Director of the United States Patent and Trademark Office*